(12) United States Patent  
Muellner

(10) Patent No.: US 10,224,757 B2
(45) Date of Patent: Mar. 5, 2019

(54) METHODS AND APPARATUS FOR ANTENNA SIGNAL LIMITER FOR RADIO FREQUENCY IDENTIFICATION TRANSPONDER

(71) Applicant: TEXAS INSTRUMENTS INCORPORATED, Dallas, TX (US)

(72) Inventor: Ernst Georg Muellner, Munich (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 158 days.

(21) Appl. No.: 15/392,234

(22) Filed: Dec. 28, 2016

(65) Prior Publication Data

US 2018/0183266 A1     Jun. 28, 2018

(51) Int. Cl.
  *H02J 50/12* (2016.01)
(52) U.S. Cl.
  CPC .................................. *H02J 50/12* (2016.02)
(58) Field of Classification Search
  CPC ....................................................... H02J 50/12
  USPC ........................................................ 307/104
  See application file for complete search history.

(56) References Cited

U.S. PATENT DOCUMENTS

| 5,347,280 | A | 9/1994 | Schuermann |
| 5,864,302 | A | 1/1999 | Kokubu et al. |
| 6,356,198 | B1 | 3/2002 | Wuidart et al. |
| 2002/0030617 | A1 | 3/2002 | Haroun et al. |
| 2002/0063622 | A1 | 5/2002 | Armstrong et al. |
| 2002/0158696 | A1 | 10/2002 | Staszewski et al. |
| 2009/0174592 | A1 | 7/2009 | Muellner |
| 2009/0189688 | A1 | 7/2009 | Nehrig et al. |
| 2010/0141389 | A1 | 6/2010 | Hagl et al. |
| 2010/0253315 | A1 | 10/2010 | Nehrig et al. |

(Continued)

FOREIGN PATENT DOCUMENTS

| RU | 2461018 C2 | 8/2006 |
| RU | 2490776 C1 | 8/2013 |

(Continued)

OTHER PUBLICATIONS

International Search Report and Written Opinion, PCT/US2018/021672, dated Jun. 7, 2018 (7 pages).

(Continued)

*Primary Examiner* — Joseph Chang
(74) *Attorney, Agent, or Firm* — Ebby Abraham; Charles A. Brill; Frank D. Cimino

(57) ABSTRACT

In described examples, an apparatus includes: at least one resonant circuit for receiving a radio frequency signal; a rectifier coupled to the resonant circuit to output a first rectified signal with a constant level portion and a portion matching a first portion of the radio frequency signal, and to output a second rectified signal having a constant level portion and a portion that matches a second portion of the radio frequency signal; a first limiter circuit to limit a voltage of the first rectified signal to a predetermined maximum voltage level; a second limiter circuit to limit the voltage of the second rectified signal to the predetermined maximum voltage level; a third limiter circuit to limit a voltage of the first rectified signal to a predetermined minimum voltage level; and a fourth limiter circuit to limit the voltage of the second rectified signal to the predetermined minimum voltage level.

20 Claims, 5 Drawing Sheets

(56) References Cited

U.S. PATENT DOCUMENTS

| | | |
|---|---|---|
| 2012/0092055 A1 | 5/2012 | Peschke et al. |
| 2012/0153894 A1* | 6/2012 | Widmer .............. H04B 5/0037 |
| | | 320/108 |
| 2012/0153903 A1* | 6/2012 | Kim .................... H02H 7/1252 |
| | | 320/148 |
| 2012/0161942 A1 | 6/2012 | Muellner et al. |
| 2013/0009706 A1 | 1/2013 | Peschke et al. |
| 2015/0145651 A1 | 5/2015 | Muellner et al. |
| 2016/0328637 A1 | 11/2016 | Viikari |

FOREIGN PATENT DOCUMENTS

| | | |
|---|---|---|
| RU | 163740 U1 | 8/2016 |
| WO | WO1999/030286 A1 | 6/1999 |

OTHER PUBLICATIONS

U.S. Appl. No. 15/459,696, entitled Integrated Circuits and Transponder Circuitry with Shared Modulation Capacitor for 3D Transponder Uplink Modulation, filed Mar. 15, 2017 (34 pages).

U.S. Appl. No. 15/459,738, entitled Integrated Circuits and Transponder Circuitry with Improved ASK Demodulation, filed Mar. 15, 2017 (44 pages).

* cited by examiner

METHODS AND APPARATUS FOR ANTENNA SIGNAL LIMITER FOR RADIO FREQUENCY IDENTIFICATION TRANSPONDER

CROSS-REFERENCE TO RELATED APPLICATIONS

This application relates to co-owned and co-assigned U.S. patent application Ser. No. 15/392,174, filed Dec. 28, 2016, entitled "METHODS AND APPARATUS FOR TRANSPONDER OSCILLATOR WITH OPTIMIZED TIMING," naming Ernst Georg Muellner as inventor, which is hereby incorporated by reference in its entirety herein.

TECHNICAL FIELD

This application relates generally to radio receivers and transmitters, and more particularly, to low power and low frequency radio frequency identification (RFID) transponders.

BACKGROUND

RFID systems are widely used in the automotive industry and other industries such as farm animal identification, building access control, and meter reading. A primary application in the automotive industry is RFID used in the portion of the anti-theft system. The anti-theft system prevents a vehicle from being started without a key or a remote control device that has been electronically paired to a specific vehicle using RFID. RFID systems often include low power radio transponders. The transponder receives a radio signal from a base unit (also known as a "reader"). The reader may be built into a vehicle or other type of system. The transponder can be powered either by an energy source such as a battery or by energy harvested from the radio frequency (RF) field produced by the reader. Some transponders are primarily powered by a battery, with the added capability of being powered by the RF field when the battery cannot provide sufficient energy or when the battery is absent.

Upon receiving an RF signal from the reader with specific characteristics, the transponder responds to the reader by transmitting an RF signal with specific characteristics. The RF signals generated by the reader and transponder are typically modulated with data. The data transmitted by the reader and transponder is system dependent. Data transmitted by the transponder may include a transponder identification code, the reading of a water meter, or data from a vehicle key to be validated by the anti-theft system. A transponder in a vehicle key can be considered an "immobilizer" because, if the reader fails to receive the correct response from the transponder in the key or a key fob, the vehicle or equipment is disabled and may not start.

FIG. 1 is a block diagram of an example RFID system 100 operating at low radio frequency (LF). An example RF frequency employed in LF RFID systems is 134 kHz. Frequencies other than 134 kHz can be used. The "transponder" (block 101 of FIG. 1) operates in response to a query issued by a "reader" (block 103 of FIG. 1). Readers and transponders operating at low radio frequencies typically employ magnetically coupled antennas in close proximity. Initially in a communication session, the reader generates an LF field at approximately the natural resonant frequency of transponder antenna tank circuit 105 of FIG. 1. The LF field generated by the reader supplies energy to the transponder by inducing an oscillation in the transponder antenna tank circuit 105 of FIG. 1. When the transponder is being powered by the LF field, the oscillation induced by the reader in the transponder antenna tank circuit is typically rectified by the transponder. This rectified signal is typically used to charge a capacitor that powers the transponder. The reader also modulates the LF field with data for the transponder. Amplitude shift keying (ASK) modulation is typically used by the reader to transmit data. Data transmitted from the reader to the transponder is the "downlink" data. The transponder demodulates and processes the downlink data. The reader stops generating the LF field after completing the downlink transmission and after sufficient time has elapsed for the transponder to store sufficient energy to respond to the reader. After processing the downlink data, the transponder responds to the reader with data typically using frequency shift keying (FSK) modulation of the LF field. The LF field generated by the transponder and the reader are typically at approximately the same frequency. The same antenna tank circuit is typically used by the transponder for both receive and transmit. Data transmitted by the transponder to the reader is the "uplink" data. The group of radio signals 107 of FIG. 1 represent the energy in the LF field supplied by the reader, the downlink data, and the uplink data.

Transponders can be implemented with multiple antennas. For example, three orthogonally positioned antennas are often used in RFID transponders where the relative orientation of the reader and transponder is not fixed. Transponders implemented with multiple antennas often have separate receive and transmit circuits dedicated to each antenna in addition to common circuits. The common circuits typically include control functions, data processing, and power supply.

When the reader completes the downlink transmission and stops generating the LF field, transponders typically employ an oscillator to sustain oscillation in the antenna tank circuit (105 of FIG. 1) by adding energy to the antenna tank circuit. The energy added to the tank circuit by the oscillator periodically increases the peak-to-peak voltage range of the antenna tank circuit oscillation.

Transponders typically employ voltage limiting circuits coupled to the antenna tank circuit (105 of FIG. 1). This voltage limiting is employed to protect transponder circuit elements and insure the antenna voltage is within a range that can be processed by the transponder.

SUMMARY

In described examples, an apparatus includes: at least one resonant circuit for receiving a radio frequency signal; a rectifier coupled to the resonant circuit to output a first rectified signal having a waveform with a constant level portion and a portion matching a first portion of the radio frequency signal, and to output a second rectified signal having a constant level portion and a portion that matches a second portion of the radio frequency signal and is out of phase with the first rectified signal; a first limiter circuit coupled to the first rectified signal to limit a voltage of the first rectified signal to a predetermined maximum voltage level; a second limiter circuit coupled to the second rectified signal to limit the voltage of the second rectified signal to the predetermined maximum voltage level; a third limiter circuit coupled to the first rectified signal to limit a voltage of the first rectified signal to a predetermined minimum voltage level; and a fourth limiter circuit coupled to the second rectified signal to limit the voltage of the second rectified signal to the predetermined minimum voltage level.

DETAILED DESCRIPTION OF EXAMPLE EMBODIMENTS

Corresponding numerals and symbols in the different figures generally refer to corresponding parts unless otherwise indicated. The figures are not necessarily drawn to scale.

The term "coupled" may include connections made with intervening elements, and additional elements and various connections may exist between any elements that are "coupled."

Figures herein that illustrate signal traces are drawn such that time scales for all traces within an individual figure (including a set of figures with the same base number such as FIGS. 2A-2C with the base figure number of 2) are approximately the same and are aligned vertically. The approximate simultaneously occurring states of all signals illustrated in a figure (including a set of figures with the same base number) are aligned vertically. The signal trace diagrams herein are drawn with representative and approximate waveform shapes. Signal delays through circuit elements are not illustrated unless the delay is important to the explanation of circuit operation.

Figure 1:
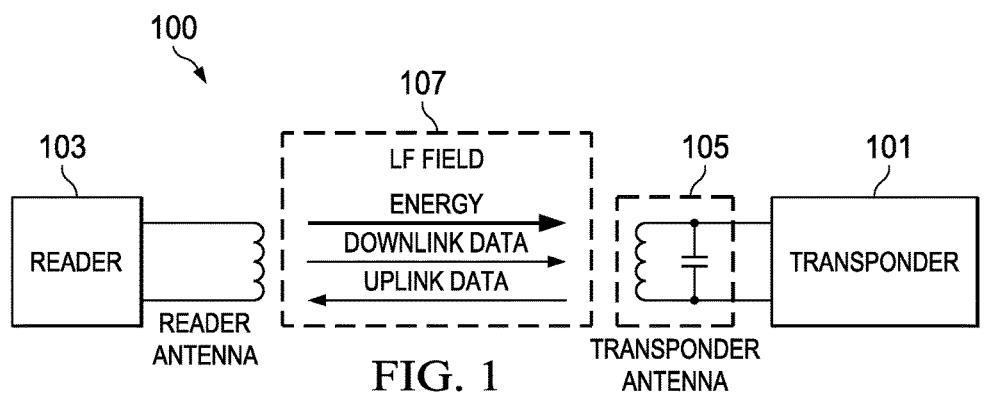
FIG. 1 is a block diagram of an example RFID system.

Conventional LF RFID transponders typically employ circuit elements that are capable of operating with a maximum voltage exceeding the voltage range typically induced in the antenna tank circuit (105 of FIG. 1). This maximum operating voltage is often 12V or more. In addition, conventional transponders often employ a break down mechanism as a voltage reference for limiting antenna voltage. Employing circuit elements with sufficiently high operating voltages and limiting the antenna voltage prevents transponder circuit damage and allows proper transponder operation over the expected full antenna voltage range. This use of circuit elements with high operating voltages may result in an overall increased transponder cost.

Conventional transponders are typically implemented with additional circuits such as an RF signal rectifier, oscillator, demodulator, modulator, power supply, and controller. These additional circuits are not critical to the description of conventional transponder antenna voltage limiting and are not described further herein.

Figure 2:
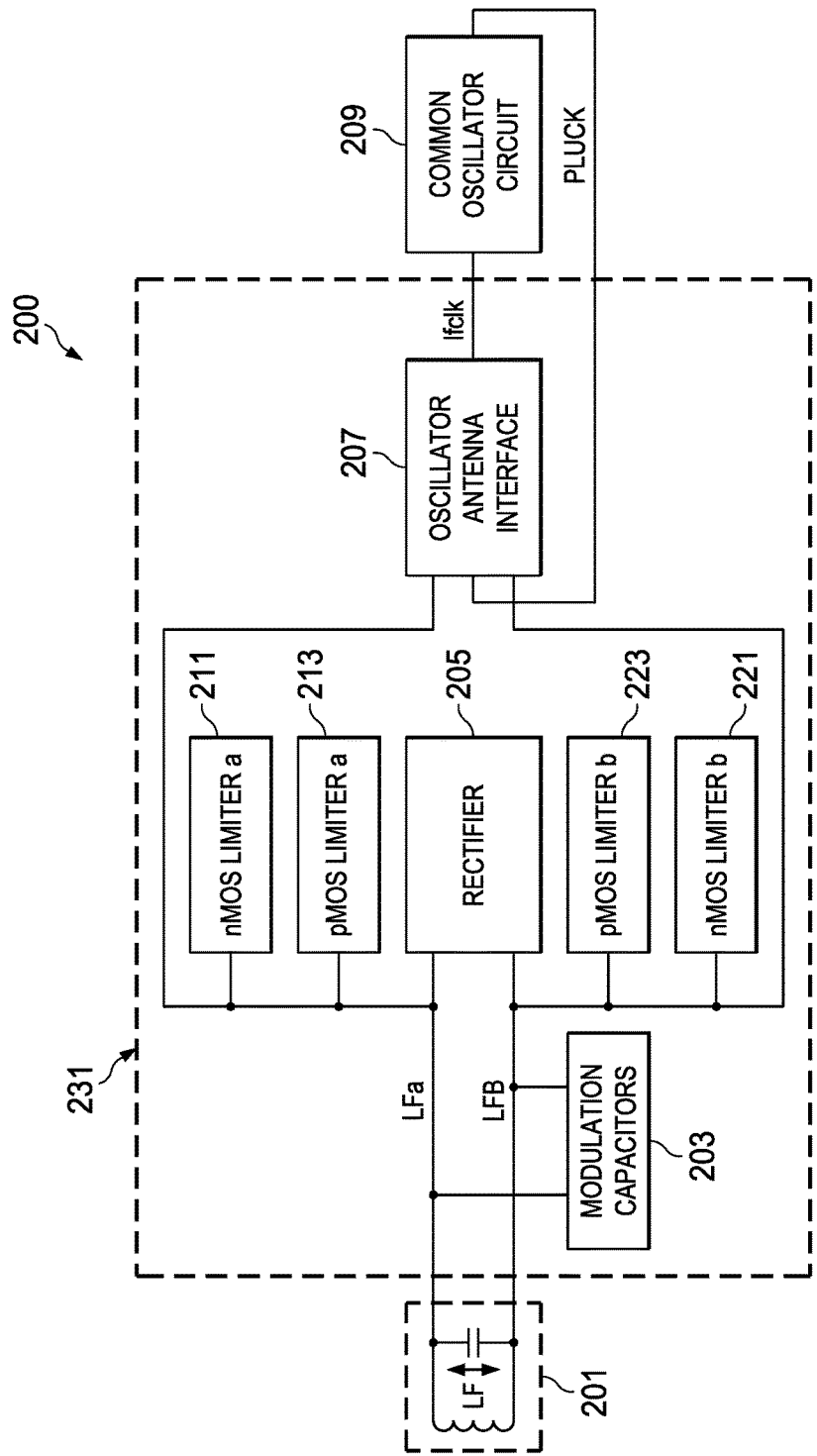
FIG. 2 is a block diagram for a portion of a low frequency RFID transponder illustrating example embodiments.

FIG. 2 is a block diagram for a portion of an example low frequency RFID transponder 200 illustrating example embodiments. It should be noted that all blocks necessary for a complete transponder system are not included in FIG. 2 for simplicity of explanation.

In circuit 200, the transponder receive and transmit antenna is the resonant tank circuit 201 of FIG. 2. The signal labeled LF in FIG. 2 is the instantaneous voltage across the parallel combination of the inductive and capacitive elements of the antenna tank circuit (201 of FIG. 2). Circuits coupled to the antenna tank circuit that generate and modify the LF signal are the "modulation capacitors," "rectifier," "oscillator antenna interface," "nMOS limiter a," pMOS limiter a," "pMOS limiter b," and "nMOS limiter b" (blocks 203, 205, 207, 211, 213, 223, 221, respectively, of FIG. 2). Also illustrated in FIG. 2 is the "common oscillator circuit," block 209. The acronym "nMOS" is defined herein as "n-channel metal oxide semiconductor." The acronym "pMOS" is defined herein as "p-channel metal oxide semiconductor." The pMOS limiter employs a pMOS transistor as the primary voltage limiting element. The nMOS limiter employs an nMOS transistor as the primary voltage limiting element.

The example embodiments include the circuits "nMOS limiter a," "pMOS limiter a," "pMOS limiter b," and "nMOS limiter b" (blocks 211, 213, 223, and 221 respectively of FIG. 2). The circuits "nMOS limiter a" and "nMOS limiter b" are two instantiations of the same embodiment nMOS limiter circuit as described hereinbelow. The circuits "pMOS limiter a" and "pMOS limiter b" are two instantiations of the same embodiment pMOS limiter circuit as described hereinbelow.

It should be noted that "LF field" is used herein in reference to the RF field that couples the reader and transponder and that "LF signal" is used herein in reference to the instantaneous voltage across the antenna tank circuit (201 of FIG. 2).

For transponders employing the example embodiments, the LFa and LFb signals have similar characteristics as described hereinbelow. The embodiment circuit "nMOS limiter a" (block 211 of FIG. 2) and the embodiment circuit "nMOS limiter b" (block 221 of FIG. 2) perform similar functions. The embodiment circuits "pMOS limiter a" (block 213 of FIG. 2) and the embodiment "pMOS limiter b" (block 223 of FIG. 2) perform similar functions. For simplicity of explanation the following conventions are used herein: The signal name LFx is used in reference to the LFa and LFb signals; the circuit name "nMOS limiter" is used in reference to the "nMOS limiter a" and "nMOS limiter b" circuits; and the circuit name "pMOS limiter" is used in reference to the "pMOS limiter a" and "pMOS limiter b" circuits.

Figure 6:
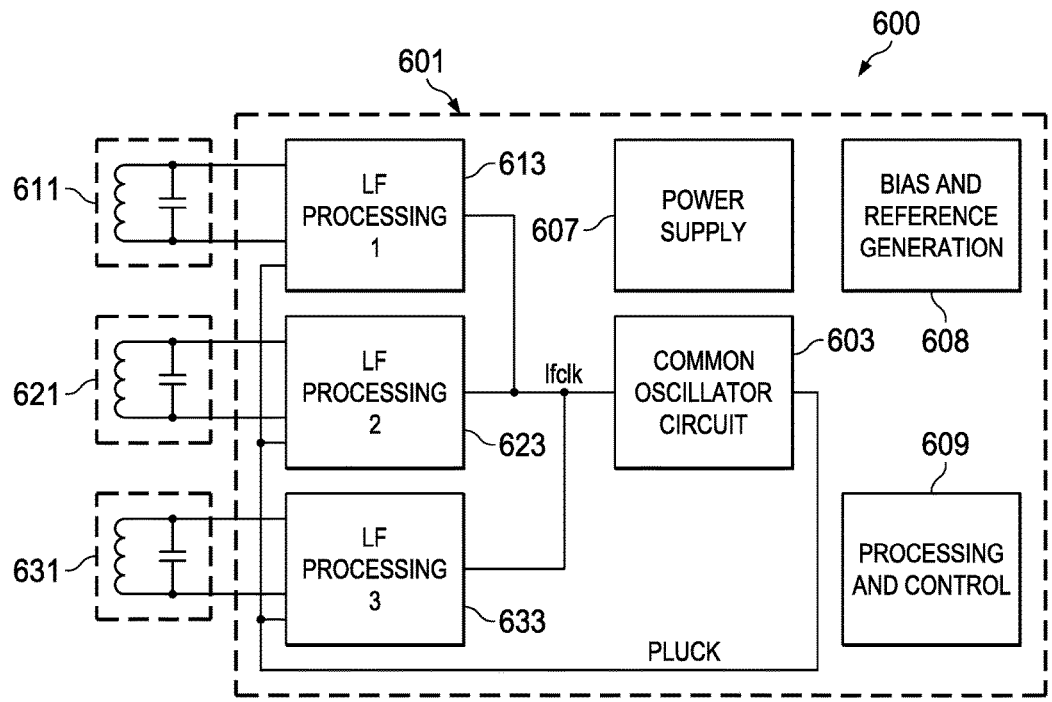
FIG. 6 is a block diagram of an example transponder.

FIG. 2 shows an example for a single antenna transponder. For transponders implemented with multiple antennas, typically one instantiation of the group of circuits 231 of FIG. 2 is implemented for each antenna. A multiple antenna transponder typically includes one instantiation of the common oscillator circuit (block 209 of FIG. 2) and other common circuits not illustrated in FIG. 2. The common circuits not illustrated in FIG. 2 typically include but are not limited to downlink demodulation, downlink data processing, uplink data generation, modulation control, bias generation, reference generation, and power supply. The circuits not included in FIG. 2 are not critical to the description of the example embodiment are omitted for simplicity of explanation. An example transponder employing multiple antennas is illustrated in FIG. 6 described hereinbelow The signals labeled LFa and LFb in FIG. 2 are at the opposite sides of antenna tank circuit (201 of FIG. 2). The rectifier circuit (block 205 of FIG. 2) rectifies the LF signal and is not described herein in detail for simplicity of explanation.

The signal labeled "lfclk" in FIG. 2 is output by the oscillator antenna interface circuit (block 207 of FIG. 2) and is an input to the common oscillator circuit (block 209 of FIG. 2). The signal labeled "pluck" in FIG. 2 is output by the common oscillator circuit (block 209 of FIG. 2) and is an input to the oscillator antenna interface circuit (block 207 of FIG. 2). The oscillator antenna interface circuit (block 207) and the common oscillator circuit (block 209) are not described herein for simplicity of explanation.

The modulation capacitors (block 203 of FIG. 2) are utilized by the transponder to modulate the LF signal with uplink data. This modulation and the modulation capacitors are not critical to the description of the example embodiment and are not described herein for simplicity of explanation.

The LFa signal is both an input and an output of the following circuits of FIG. 2: "nMOS limiter a" (block 211), "pMOS limiter a" (block 213), the rectifier (block 205), oscillator antenna interface circuit (block 207), the modulation capacitors (block 203), and the antenna tank circuit (201 of FIG. 2). The LFb signal is both an input and an output of the following circuits of FIG. 2: "nMOS limiter b" (block 221), "pMOS limiter b" (block 223), the rectifier (block 205), oscillator antenna interface circuit (block 207), the modulation capacitors (block 203), and the antenna tank circuit (201 of FIG. 2).

Circuits illustrated in FIG. 2 may require enable signals. Enable signals may include, for example, a signal indicating that the power supply is in a regulated state. The description of circuit operation herein does not include all enable signals. Circuit descriptions herein are based on circuits being enabled unless otherwise stated.

Transponders can be implemented with multiple antennas to improve performance when varying spatial orientations of reader and transponder are possible. The description herein of the transponder in the example of FIG. 2 is applicable to a single antenna implementation as well as to each antenna of a multiple antenna implementation. An example transponder employing 3 antennas is illustrated in FIG. 6 described hereinbelow.

Figure 3A:
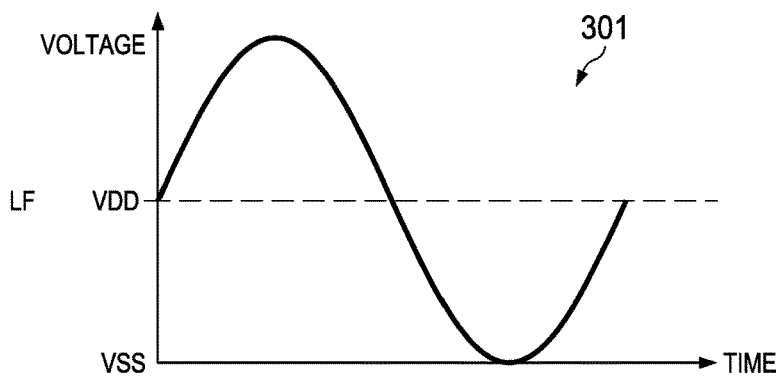
FIGS. 3A-3C illustrate signal traces showing the result of the full-wave rectifier function.
Figure 3B:
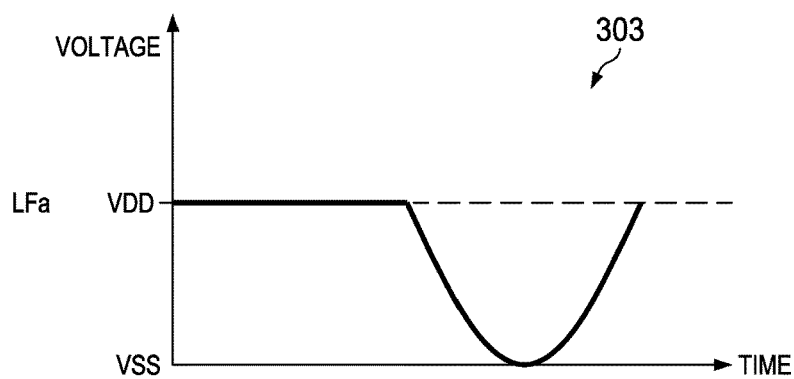
Figure 3C:
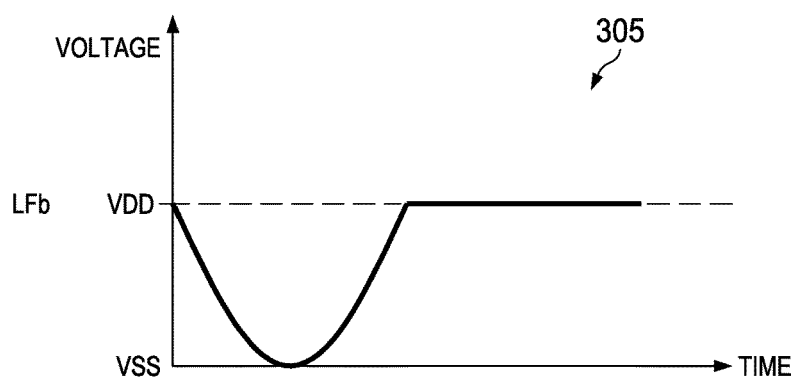

FIGS. 3A-3C illustrate signal traces showing the result of the full-wave rectifier function of block 205 of FIG. 2. Typical waveforms for the LF, LFa, and LFb signals are illustrated as traces 301 of FIG. 3A, 303 of FIG. 3B, and 305 of FIG. 3C, respectively. The LF signal is illustrated in FIG. 3A as a sine wave. The LFa, and LFb signals (traces 303 of FIG. 3B and 305 of FIG. 3C respectively) are each illustrated as half-wave rectifications of the LF signal. For clarity of explanation, the half cycle of the LF signal where the sine wave voltage is greater than the power supply (VDD) is the "first half cycle" of the LF signal. The "second half cycle" of the LF signal is where the LF sine wave voltage is less than VDD. The rectification of the LF signal that produces the LFa signal limits the voltage of the signal LFa approximately to the power supply voltage (VDD) during the first half cycle of the LF signal as illustrated in trace 303 of FIG. 3B. During the subsequent second half cycle of the LF signal, the voltage of the signal LFb is limited approximately to VDD as illustrated in trace 305 of FIG. 3C. During the second half cycle of the LF signal, the LFa waveform is approximately equivalent to the LF waveform. During the first half cycle of the LF signal, the LFb waveform is approximately equivalent to the inverted LF waveform. This inversion is with respect to the VDD voltage level. For simplicity of explanation, departures from these ideal waveforms are not illustrated in FIGS. 3A-3C. Such departures from ideal waveforms include the effects of the following circuits and functions of the transponder: the nMOS and pMOS limiters described hereinbelow, the oscillator antenna interface (block 207 of FIG. 2), and uplink and downlink modulation.

The transponder in the example of FIG. 2 is implemented with three power modes when being powered from the LF field (without another power source such as a battery). The "first power mode" is the initial power up, where the voltage level provided by the transponder power supply is too low to operate a voltage reference (such as a band gap circuit.) The example embodiment is described herein as being part of a transponder that employs a band gap circuit for voltage regulation. Other types of voltage references can be used. The "second power mode" is where the voltage level provided by the power supply is sufficient for operation of the band gap circuit, but below the voltage level necessary for power supply regulation. The "third power mode" is where the band gap is operating and the power supply is being regulated. The power supply is not regulated when the first and second power modes are active. When a battery or external power source is powering the transponder, typically the first and second power modes do not become active, and the third power mode is always active when the transponder is powered on. When the third power mode is active and the transponder is being powered by energy harvested from the LF field, the voltage level of the harvested energy exceeds the maximum power supply voltage. Voltage limiting and power supply regulation constrain the power supply voltage to approximately this maximum power supply voltage. Voltage limiting is described hereinbelow. Power supply regulation is not described herein for simplicity of explanation. The maximum power supply voltage chosen is dependent on the transponder implementation for a specific application.

The example embodiment nMOS limiters (blocks 211 and 221 of FIG. 2) constrain the maximum voltage of the LFa and LFb signals while the first power mode is active as described hereinbelow. When the second and third power modes are active the maximum voltages of the signals LFa and LFb are constrained by the rectifier (block 205 of FIG. 2). When the third power mode is active, the example embodiment pMOS limiters (blocks 213 and 223 of FIG. 2) constrain the minimum voltage of the LFa and LFb signals as described hereinbelow. When first and second power modes are active, an approach such as diode clamping to ground is employed to constrain the minimum voltages of the LFa and LFb signals. This diode clamping is not further described herein for simplicity of explanation. The function of limiting the maximum voltages of the signals LFa and LFb by the rectifier is not described herein for simplicity of explanation.

Figure 4:
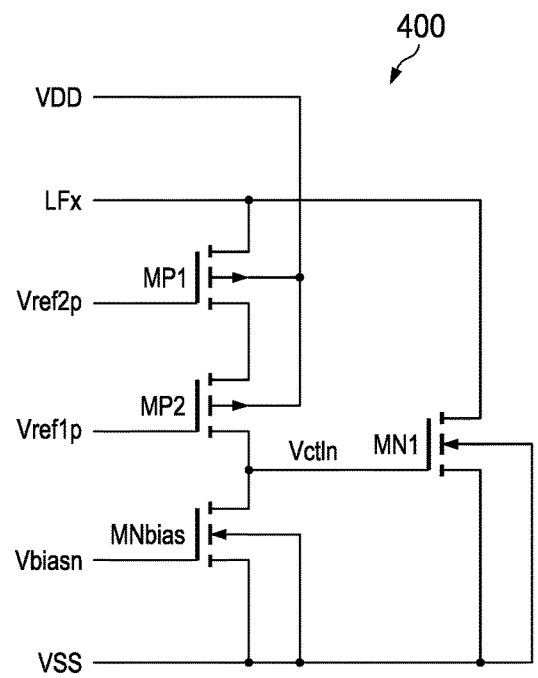
FIG. 4 is a circuit diagram of the example embodiment nMOS limiter.

FIG. 4 is a circuit diagram 400 of the example embodiment nMOS limiter. Circuit 400 corresponds to blocks 211 and 221 of FIG. 2. One instantiation of circuit 400 corresponds to "nMOS limiter a" (block 211 of FIG. 2). A second instantiation of circuit 400 corresponds to "nMOS limiter b" (block 221 of FIG. 2).

In the example embodiment nMOS limiter (circuit 400 of FIG. 4), transistors MP1, MP2, and MNbias control the limiting function for the voltage of the signal LFx. The function of limiting the voltage of the signal LFx is performed by transistor MN1. The signal LFx corresponds to signal LFa coupled "nMOS limiter a" (block 211 of FIG. 2). LFx also corresponds to signal LFb coupled "nMOS" limiter b" (blocks 221 of FIG. 2). In circuit 400 the signals VDD and VSS are the power supply voltage and ground respectively. The voltage of VDD is positive with respect to VSS. The signal LFx is coupled to the drains of MP1 and MN1. The signal Vref2p is coupled to the gate of transistor MP1. The source of MP1 is coupled to the drain of MP2. The signal Vref1p is coupled to the gate of MP2. The signal Vctln is coupled to the source of MP2, the drain of transistor MNbias, and to the gate of transistor MN1. The signal Vbiasn is coupled to the gate of transistor MNbias. The bodies of transistors MP1 and MP2 are coupled to VDD. The sources and bodies of MN1 and MNbias are coupled to VSS. The signals Vref1p, Vref2p, and Vbiasn are generated external to the example embodiment and are not fully described herein for simplicity of explanation.

In operation, the example embodiment nMOS limiter of FIG. 4 is active in the first power mode. The voltage of signal Vref2p of FIG. 4 is positive when all three power modes are active. Vref2p is supplied by an external circuit as described hereinbelow. When the first power mode is active, the voltage of the signal Vref1p of FIG. 4 is set external to circuit 400 of FIG. 4 to approximately zero. With these voltages on the signals Vref1p and Vref2p, when the voltage of the signal LFx increases to approximately the voltage level of Vref2p plus the gate to drain threshold voltage (Vtmp1) of transistor MP1 of FIG. 4, the transistors MP1 and MP2 of FIG. 4 begin conducting. The voltage Vtmp1 plus the greater of the voltages of the signals Vref1p and Vref2p is the "nMOS limiter voltage." Thus, when the first power mode is active with the voltage of the signal Vref1p set to approximately zero, the nMOS limiter voltage is the voltage of the signal Vref2p plus Vtmp1. When MP1 and MP2 are conducting, the voltage of signal Vctln of FIG. 4 increases, and transistor MN1 of FIG. 4 begins conducting. When transistor MN1 is conducting, a path from the signal LFx to VSS is established, resulting in the reduction of the voltage of the signal LFx. Thus the maximum voltage of the signal LFx is limited to approximately the nMOS limiter voltage. During each cycle of the LFx signal, when the voltage of LFx falls below the nMOS limiter voltage, conduction through MP1 is blocked. When there is no conduction through the transistors MP1 and MP2 in series, the transistor MNbias of FIG. 4 discharges the voltage of signal Vctln, turning off MN1. With conduction through MN1 blocked, the path from the signal LFx to VSS is blocked. When the path from LFx to VSS blocked, the nMOS limiter does not constrain the voltage of LFx. During the next cycle of the signal LFx, when the voltage of the signal LFx again increases to approximately the nMOS limiter voltage, limiting of the maximum voltage of LFx by the nMOS limiter as described hereinabove repeats. One cycle of the signal LFx is illustrated in trace 303 of FIG. 3B as the signal LFa, and one cycle of LFx is illustrated in trace 305 of FIG. 3C as the signal LFb. Not illustrated in FIG. 4 is an additional discharge path for the signal Vctln to VSS that operates when the power supply voltage is near zero. In such a case, the signal Vctln cannot be discharged through transistor MNbias.

The voltage of the signal Vref2p of FIG. 4 can be supplied by an inaccurate voltage reference circuit such as a resistive divider coupled between VDD and VSS. This circuit increases the voltage of the signal Vref2p as VDD increases. VDD increases due to increasing energy harvested from the LF field produced by the reader. The nMOS limiter voltage also increases as the voltage of the signal Vref2p increases. (The relationship between the voltage of Vref2p and the nMOS limiter voltage is described hereinabove.) This approach for supplying the voltage of the signal Vref2p allows the supply voltage VDD to increase to the level required to operate the band gap circuit (not shown). The transponder employs a band gap circuit or other accurate voltage reference when power mode three is active as described hereinbelow.

When the first power mode of the transponder is active, there is a power supply voltage below which the rectifier (block 205 of FIG. 2) does not function. This minimum voltage sufficient for rectifier operation is dependent upon the implementation of the rectifier for a specific application. When the rectifier is not functioning due to this low voltage level, the nMOS limiter provides protection from excessive voltage (such as voltage spikes) of the signals LFa and LFb.

When the second and third power modes are active, the rectifier (block 205 of FIG. 2) constrains the maximum voltage of the LFx signal to approximately VDD. In addition, when the second and third power modes are active, the voltage of Vref1p of FIG. 4 is set by a circuit external to circuit 400 of FIG. 4 to be approximately equivalent to VDD. When Vref1p is approximately equivalent to VDD, transistor MP2 of FIG. 4 is off. Thus the maximum voltage of LFx is not limited by the nMOS limiter (circuit 400 of FIG. 4) when the second and third power modes are active. When the second power mode is active, VDD continues increasing as increasing energy is harvested from the LF field. When VDD increases to a sufficient voltage for the regulated power supply of the transponder to operate, VDD becomes approximately fixed due to this power supply regulation. As described hereinabove, the third power mode occurs when the regulated power supply is operating.

Figure 5:
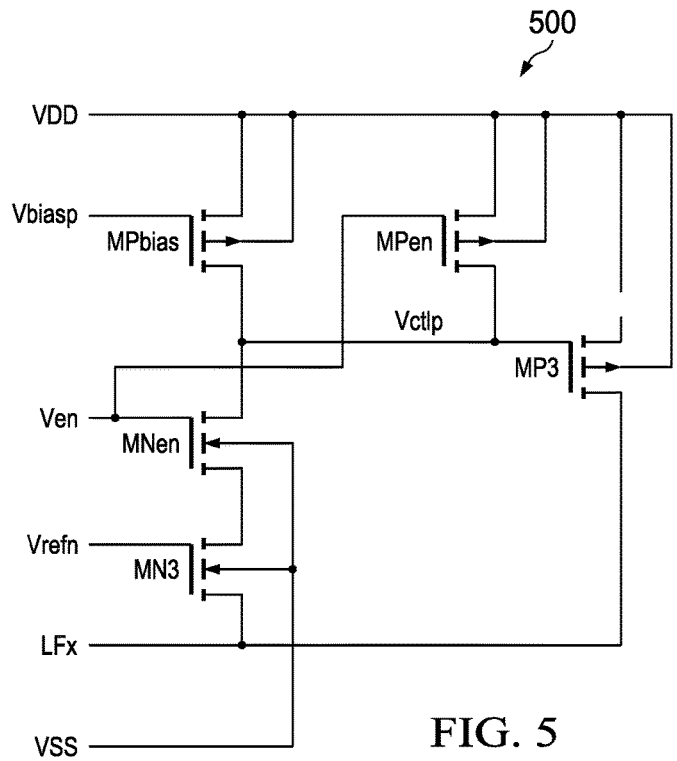
FIG. 5 is a circuit diagram of the example embodiment pMOS limiter.

FIG. 5 is a circuit diagram 500 of the example embodiment pMOS limiter corresponding blocks 213 and 223 of FIG. 2. One instantiation of circuit 500 corresponds to "pMOS limiter a" (block 213 of FIG. 2). A second instantiation of circuit 500 corresponds to "nMOS limiter b" (block 223 of FIG. 2).

In the example embodiment pMOS limiter (circuit 500 of FIG. 5), transistors MN3, MNen, MPbias, and MPen control the limiting function for the voltage of the signal LFx. The function of limiting the voltage of the signal LFx is performed by transistor MP3. The signal LFx corresponds to signal LFa coupled to "pMOS limiter a" (block 213 of FIG. 2). The signal LFx also corresponds to signal LFb coupled to "pMOS" limiter b" (block 223 of FIG. 2). In circuit 500, the signal LFx is coupled to the drains of transistors MN3 and MP3. The signals VDD and VSS are the power supply voltage and ground, respectively. The voltage of VDD is positive with respect to VSS. The signal Vrefn is coupled to the gate of transistor MN3. The source of MN3 is coupled to the drain of transistor MNen. The gates of transistors MNen and MPen are coupled to the signal Ven. The source of MNen is coupled to the signal Vctlp. The signal Vctlp is also coupled to the drains of transistors MPbias and MPen and to the gate of transistor MP3. The gate of MPbias is coupled to the signal Vbiasp. The sources and bodies of transistors MP3, MPen, and MPbias are coupled to VDD. The bodies of MN3 and MNen are coupled to VSS. The signals Vrefn, Ven, and Vbiasp are generated external to the example embodiment and are not described herein for simplicity of explanation.

In operation, the example embodiment pMOS limiter of FIG. 5 is active when the transponder is operating in the third power mode. When the transponder is operating in the first and second power modes, the voltage of the signal Ven of FIG. 5 is low, disabling the pMOS limiter. A low voltage on the signal Ven disables the pMOS limiter by turning off transistor MNen, and turning on transistor MPen, thus pulling up the voltage of the signal Vctlp of FIG. 5. With the voltage of Vctlp pulled up, transistor MP3 is turned off, blocking the path from the signal LFx to VDD, and disabling the limiting function of the pMOS limiter.

When the transponder is operating in the third power mode, the voltage of the signal Ven of FIG. 5 is high, enabling the pMOS limiter (circuit 500 of FIG. 5) by turning off transistor MPen of FIG. 5 and turning on transistor MNen of FIG. 5. When the voltage of the signal LFx is less than one drain to gate voltage threshold (Vtmn3) of transistor MN3 of FIG. 5 below the voltage of the signal Vrefn, MN3 conducts. The "pMOS limiter voltage" is Vtmn3 subtracted from the voltage of the signal Vrefn of FIG. 5. With both transistors MN3 and MNen conducting, the voltage of the signal Vctlp of FIG. 5 is decreased, turning on transistor MP3 of FIG. 5. When MP3 conducts a path from signal LFx to VDD is established, and the voltage of LFx is increased. Thus the minimum voltage of LFx is limited to approximately the pMOS limiter voltage. The pMOS limiter can be implemented such that the voltage of Vrefn of FIG. 5 is approximately Vtmn3 above VSS. With the voltage of Vrefn set to approximately Vtmn3 above VSS, the pMOS limiter voltage is approximately equivalent to VSS. Thus the minimum voltage of the signal LFx is limited to approximately VSS.

When the voltage of the signal LFx cycles above the pMOS limiter voltage, the transistor MN3 of FIG. 5 turns off. When MN3 is off, the voltage of signal Vctlp of FIG. 5 increases as the result of the conduction path between the signal Vctlp and VDD through transistor MPbias of FIG. 5. The increased voltage of Vctlp turns off transistor MP3 of FIG. 5. With MP3 not conducting, the path from the signal LFx to VDD is blocked. When the path between LFx and VDD is blocked, the pMOS limiter does not constrain the voltage of LFx. During the next cycle of the LFx signal, when the voltage of LFx drops below the pMOS limiter voltage, limiting of the minimum voltage of the signal LFx by the pMOS limiter described hereinabove repeats. One cycle of the signal LFx is illustrated in trace 303 of FIG. 3B as the signal LFa, and one cycle of LFx is illustrated in trace 305 of FIG. 3C as the signal LFb.

When the transponder is powered by energy harvested from the LF field produced by a reader, the example embodiment nMOS limiter (circuit 400 of FIG. 4) allows the power supply voltage (VDD) to increase to a level sufficient for an internal voltage reference such as a band gap circuit to function, as described hereinabove. This accurate voltage reference such as a band gap circuit is employed such that the embodiment pMOS limiter (circuit 500 of FIG. 5) accurately limits the minimum voltage of the signal LFx. In addition, with an accurate voltage reference, a transponder can be implemented with a regulated power supply with a voltage output near the maximum operating limits of the transponder circuit elements. This voltage limiting accuracy and this near maximum power supply voltage result in improved quality of the signal transmitted by the transponder to the reader.

As described hereinabove, the embodiment nMOS limiter (circuit 400 of FIG. 4) constrains the maximum voltage of the signal LFx by providing a conduction path between the signal LFx and the power supply ground (VSS). Also described herein above, the embodiment pMOS limiter (circuit 500 of FIG. 5) constrains the minimum voltage of the signal LFx by providing a conduction path between the signal LFx and VDD. These approaches to limiting the voltage of LFx are independent of the power supply power voltage. Thus, the power supply voltage can exceed the antenna voltage range.

FIG. 6 is a block diagram of an example transponder circuit 600. Circuit 600 includes a circuit 601 and three antenna tank circuits (circuits 611, 621, and 631) external to circuit 601. In an example implementation, the circuit 601 can be formed as a single integrated circuit. In additional example implementations, the circuit 601 can be formed using multiple integrated circuits and/or discrete components on a board or a module. Multiple integrated circuits can be packaged in a single unit, such as stacked die packages or multichip modules, for ease of use and to further increase integration. The circuit 601 of FIG. 6 employs circuits corresponding to those illustrated in FIG. 2 as described hereinbelow. A typical transponder also employs circuits including the following: "power supply;" "bias and reference generation;" and "processing and control" (blocks 607, 608, and 609 respectively of FIG. 6). The operation and details of the blocks 607, 608, and 609 of FIG. 6 are not described herein in detail for simplicity of explanation. Transponder implementations may include an energy source such as battery external to circuit 601 of FIG. 6. An energy source such as a battery is not illustrated in FIG. 6 for simplicity of explanation. Transponders may be implemented with external data and control connections for purposes such as individual transponder configuration. External data and control connections are not illustrated in FIG. 6 for simplicity of explanation.

The circuit 601 of FIG. 6 is implemented with three "LF processing" circuits labeled "LF processing 1," "LF processing 2," and "LF processing 3" (blocks 613, 623, and 633 respectively of FIG. 6). The LF processing circuits (blocks 613, 623, and 633 of FIG. 6) are individually coupled to the antenna tank circuits 611, 621, and 631 respectively of FIG. 6. Each LF processing circuit (blocks 613, 623, and 633 of FIG. 6) is an instantiation of a group of circuits corresponding to 231 of FIG. 2. Each LF processing circuit (blocks 613, 623, and 633 of FIG. 6) includes one instantiation of each the following circuits: oscillator antenna interface (corresponding to block 207 of FIG. 2), rectifier (corresponding to block 205 of FIG. 2), and modulation capacitors circuit (corresponding to block 203 of FIG. 2). Each LF processing circuit (blocks 613, 623, and 633 of FIG. 6) also includes two instantiations of the embodiment nMOS limiter (corresponding to blocks 211 and 221 of FIG. 2) and two instantiations of the embodiment pMOS limiter (corresponding to blocks 213 and 223 of FIG. 2). The circuit 601 of FIG. 6 also includes one instantiation of the common oscillator circuit (block 603 of FIG. 6). This common oscillator circuit (block 603 of FIG. 6) corresponding to block 209 of FIG. 2. The signals labeled lfclk and pluck in FIG. 2 correspond, respectively, to the signals lfclk and pluck illustrated in FIG. 6.

The functionality of transponder 600 of FIG. 6, employing three antennas, is similar to the functionality the single antenna transponder described hereinabove except as now described. The processing and control circuit (block 609 of FIG. 6) selects one of the LF processing blocks (613, 623, or 633 of FIG. 6) to perform functions including output of the signal lfclk and responding to the signal pluck. In one example, this selection is based on the LF processing circuit (blocks 613, 623, or 633 of FIG. 6) that is receiving the most energy from the LF field produced by the reader. Circuitry to detect these received energy levels is not described herein for simplicity of explanation. In addition, circuits for enabling the generation of the signal lfclk and enabling the response to the signal pluck by one of these LF processing circuits are not described herein for simplicity of explanation. The transponder embodiment of FIG. 6 can form part of a vehicle ignition system to prevent unauthorized use or theft of a vehicle. For example, the transponder 600 can be part of a vehicle key or a key fob. A reader in the vehicle will send RF signals that can both power the transponder 600 and also request a specific response. If the response uploaded from the transponder to the reader does not include an appropriate code, the vehicle will not start.

Alternative embodiments can be implemented with circuits or components that differ from those described hereinabove. For example, different types of transistors than those illustrated herein can be employed with corresponding circuit modifications for proper operation of the alternative embodiment. Alternative embodiments can be implemented with circuits that function differently than those described herein but that employ either one or both of the two voltage limiters for the LF signal now described. In the alternative embodiments, a first LF signal limiter that functions at a low power supply voltage that may be unregulated. This first LF signal limiter constrains the maximum voltage of the LF signal when the power supply output is approximately zero volts and above. In addition, this first LF signal limiter allows the power supply voltage to increase such that an accurate voltage reference operates. A second LF signal limiter that functions when the transponder power supply is producing a normal operating voltage that may be regulated. This second limiter accurately constrains the minimum voltage of the LF signal.

Figure 7:
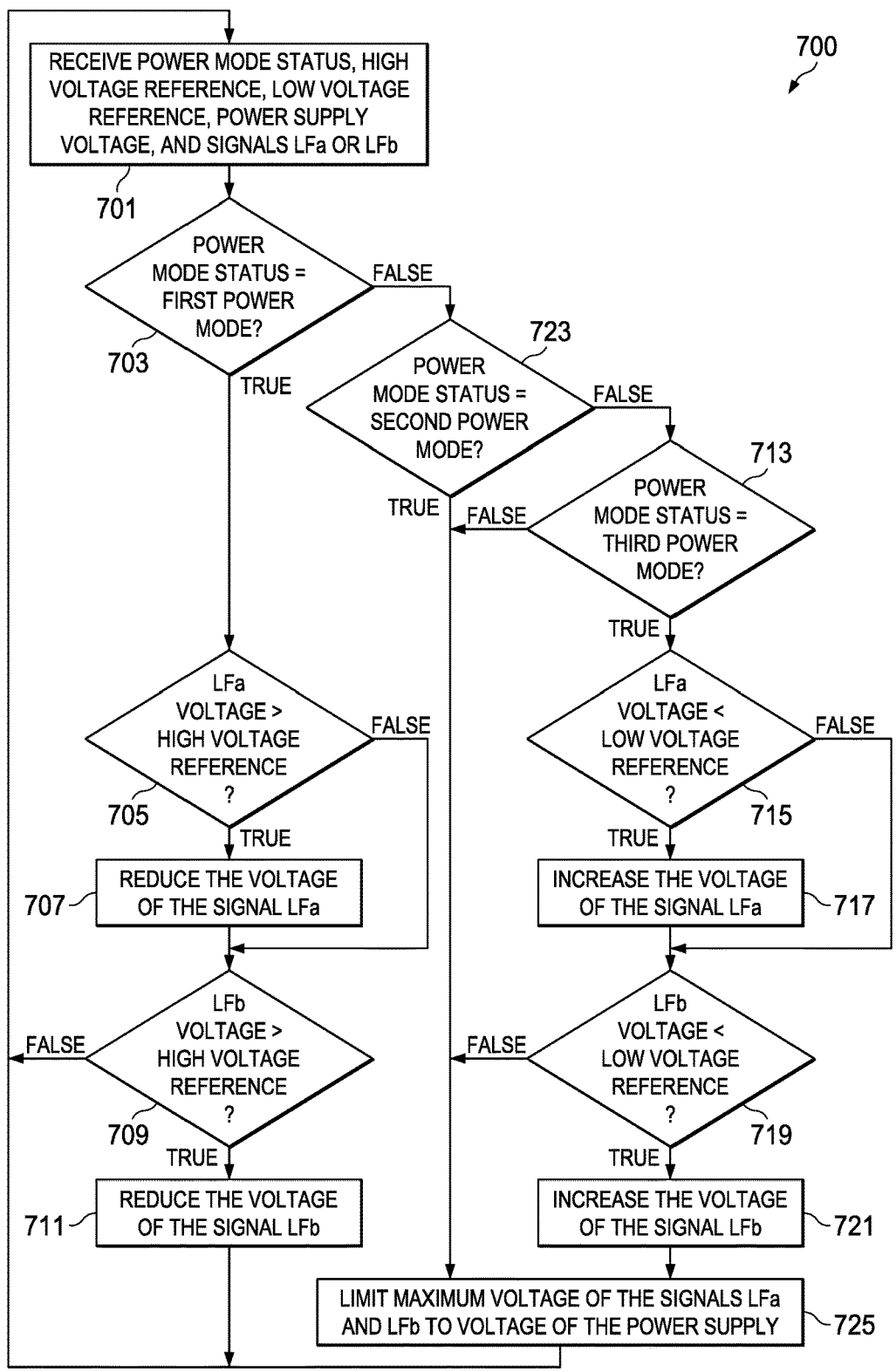
FIG. 7 illustrates in a flow diagram an example method embodiment.

FIG. 7 illustrates in a flow diagram an example method embodiment 700. Method 700 begins at step 701 in which the following are received: rectified low frequency radio signals LFa and LFb, power mode status, a high voltage reference, a low voltage reference, and a power supply voltage. From step 701 the method transitions to step 703.

At step 703 a comparison is made. If the power mode status indicates the first power mode (the initial power up state) is active, the comparison is true and the method transitions to step 705. At step 705 another comparison is made. If the voltage of the signal LFa is greater than the high voltage reference, the comparison is true and the method transitions to step 707. At step 707 the voltage of signal LFa is reduced. From step 707 the method transitions to step 709.

Returning to step 705, if the comparison is false, the method transitions to step 709.

At step 709 a comparison is made. If the voltage of the signal LFb is greater than the high voltage reference, the comparison is true and the method transitions to step 711. At step 711 the voltage of the signal LFb is reduced. From step 711 the method transitions to step 701, and the method repeats.

Returning to step 709, if the comparison is false the method transitions to step 701, and the method repeats.

Returning to step 703, if the comparison is false the method transitions to step 723. At step 723 a comparison is made. If the power mode status indicates the second power mode is active, the comparison is true and the method transitions to step 725. The second power mode is the intermediate power state prior to the power supply reaching maximum voltage and being regulated. At step 725 the maximum voltages of the signals LFa and LFb are each limited to the current power supply voltage by a rectifier. From step 725 the method transitions to step 701, and the method repeats.

Returning to step 723, if the comparison is false the method transitions to step 713.

At step 713 a comparison is made. If the power mode status indicates the third power mode is active, the comparison is true and the method transitions to step 715. When the third power mode is active the power supply is being regulated and at maximum voltage. At step 715 another comparison is made. If the voltage of the LFa signal is less than the low voltage reference, the comparison is true and the method transitions to step 717.

At step 717 the voltage of the signal LFa is increased. From step 717 the method transitions to step 719.

Returning to step 715, if the comparison is false, the method transitions to step 719.

At step 719 a comparison is made. If the voltage of the signal LFb is less than the low voltage reference, the comparison is true and the method transitions to step 721. At step 721 the voltage of the signal LFb is increased. From step 721 the method transitions to step 725.

Returning to step 719, if the comparison is false the method transitions to step 725, Returning to step 713, if the comparison is false the method transitions to step 725.

It should be noted that the signals LFa and LFb are both inputs to and outputs from the method 700. Outputs from the method are the modifications of the voltage of the signal LFa (in steps 707, 717, and 725) and the modifications of the voltage of the signal LFb (in steps 711, 721, and 725).

In addition, it should be noted that the embodiments can include limiting the minimum voltages of the signals LFa and LFb to approximately the ground voltage when the first and second power modes are active (when the comparisons of steps 703 and 723 are true). This limiting to approximately ground can be implemented with an approach such as a clamping circuit.

Note that the order of steps illustrated in the example embodiment of FIG. 7 illustrate one approach to performing the method. Alternative embodiments can be formed using a different order of steps and different steps operating concurrently. Steps can be combined and steps can be divided into additional steps. For example, steps 705 and 707 can function concurrently with the functioning of steps 709 and 711. Similarly, steps 715 and 717 can function concurrently with the functioning of steps 719 and 721. These alternatives are contemplated as forming additional embodiments within the scope of the appended claims.

Modifications are possible in the described embodiments, and other embodiments are possible within the scope of the claims.

What is claimed is:

1. A method, comprising:
    forming a first rectified signal from a received radio frequency signal, the first rectified signal having a constant level portion and a second portion corresponding to half of a waveform of the received radio frequency signal;
    forming a second rectified signal from the received radio frequency signal having a constant level portion and a second waveform portion that is of opposite phase to the second portion of the first rectified signal;
    determining a first power mode is active, in which the first power mode is an initialization mode, and if the first power mode is active, comparing the first rectified signal to a high voltage reference, and if the first rectified signal exceeds the high voltage reference, limiting the maximum voltage of the first rectified signal, and comparing the second rectified signal to the high voltage reference, and if the second rectified signal exceeds the high voltage reference, limiting the maximum voltage of the second rectified signal;
    determining a second power mode is active, the second power mode being a band gap active mode, and if the second power mode is active, limiting the maximum voltage level of the first rectified signal and maximum voltage level of the second rectified signal to a positive voltage level of a power supply;

determining a third power mode is active, in which the third power mode is a power regulation mode, and if the third power mode is active, comparing the first rectified signal to a low voltage reference, and if the first rectified signal is less than the low voltage reference, limiting the minimum voltage of the first rectified signal, and comparing the second rectified signal to the low voltage reference, and if the second rectified signal is less than the low voltage reference, limiting the minimum voltage of the second rectified signal.

2. The method of claim 1, in which determining the first power mode is active further includes coupling the first rectified signal to a first limiter circuit to limit the first rectified signal to a maximum voltage level; and coupling the second rectified signal to a second limiter circuit to limit the second rectified signal to a maximum voltage level.

3. The method of claim 2 and further including determining that the first rectified signal exceeds the high voltage reference and reducing the first rectified signal, responsive to the determining.

4. The method of claim 2 and further including determining that the second rectified signal exceeds the high voltage reference and reducing the second rectified signal, responsive to the determining.

5. The method of claim 2 in which coupling the first rectified signal to a first limiter circuit further includes coupling the first rectified signal to a ground voltage through a current conduction path of a first transistor.

6. The method of claim 5 in which coupling the first rectified signal to a ground voltage through the first transistor includes coupling through an n-type MOS transistor.

7. The method of claim 1, in which determining the second power mode is active further includes coupling the first rectified signal and the second rectified signal to a rectifier circuit.

8. The method of claim 1, in which determining a third power mode is active further includes coupling the first rectified signal to a third limiter circuit that limits the minimum voltage of the first rectified signal, and coupling the second rectified signal to a fourth limiter circuit that limits the minimum voltage of the second rectified signal.

9. The method of claim 8, in which coupling the first rectified signal to a third limiter circuit further includes coupling the first rectified signal to a power supply through a current conduction path of a second transistor.

10. The method of claim 9 in which coupling the first rectified signal to a power supply through the second transistor includes coupling through a p-type MOS transistor.

11. An apparatus, comprising
at least one resonant circuit for receiving a radio frequency signal;
a rectifier coupled to the resonant circuit to output a first rectified signal having a waveform with a constant level portion and a portion matching a first portion of the radio frequency signal, and to output a second rectified signal having a constant level portion and a portion that matches a second portion of the radio frequency signal and is out of phase with the first rectified signal;
a first limiter circuit coupled to the first rectified signal to limit a voltage of the first rectified signal to a predetermined maximum voltage level;
a second limiter circuit coupled to the second rectified signal to limit the voltage of the second rectified signal to the predetermined maximum voltage level;
a third limiter circuit coupled to the first rectified signal to limit a voltage of the first rectified signal to a predetermined minimum voltage level; and
a fourth limiter circuit coupled to the second rectified signal to limit the voltage of the second rectified signal to the predetermined minimum voltage level.

12. The apparatus of claim 11, in which the first limiter circuit includes a first transistor having a current conduction path selectively coupling the first rectified signal to a ground voltage supply when the first rectified signal exceeds a predetermined first reference voltage.

13. The apparatus of claim 12 in which the first transistor is an n-type MOS transistor.

14. The apparatus of claim 11, in which the third limiter circuit includes a second transistor having a current conduction path selectively coupling the first rectified signal to a positive voltage supply when the first rectified signal falls below a predetermined second reference voltage.

15. The apparatus of claim 14 in which the second transistor is a p-type MOS transistor.

16. The apparatus of claim 11, in which the first limiter circuit is enabled during first power mode corresponding to an initial powering up phase.

17. The apparatus of claim 11, in which the second limiter circuit is enabled during a third power mode corresponding to a power regulation phase.

18. An integrated circuit transponder, comprising:
a rectifier circuit coupled to a receive radio frequency signals from at least a first resonant circuit, and to form a first rectified signal and to form a second rectified signal;
a first limiter circuit coupled to the first rectified signal to limit a voltage of the first rectified signal to a predetermined maximum voltage level;
a second limiter circuit coupled to the second rectified signal to limit a voltage of the second rectified signal to the predetermined maximum voltage level;
a third limiter circuit coupled to the first rectified signal to limit the voltage of the first rectified signal to a predetermined minimum voltage level; and
a fourth limiter circuit coupled to the second rectified signal to limit the voltage of the second rectified signal to the predetermined minimum voltage level.

19. The integrated circuit transponder of claim 18, and further comprising circuitry to generate a power supply signal from the first rectified signal and the second rectified signal.

20. The integrated circuit transponder of claim 18, in which the integrated circuit transponder is installed in a vehicle ignition system.

* * * * *